Oct. 17, 1944.                W. A. EATON                2,360,659
                           BRAKE MECHANISM
                         Filed Dec. 16, 1942
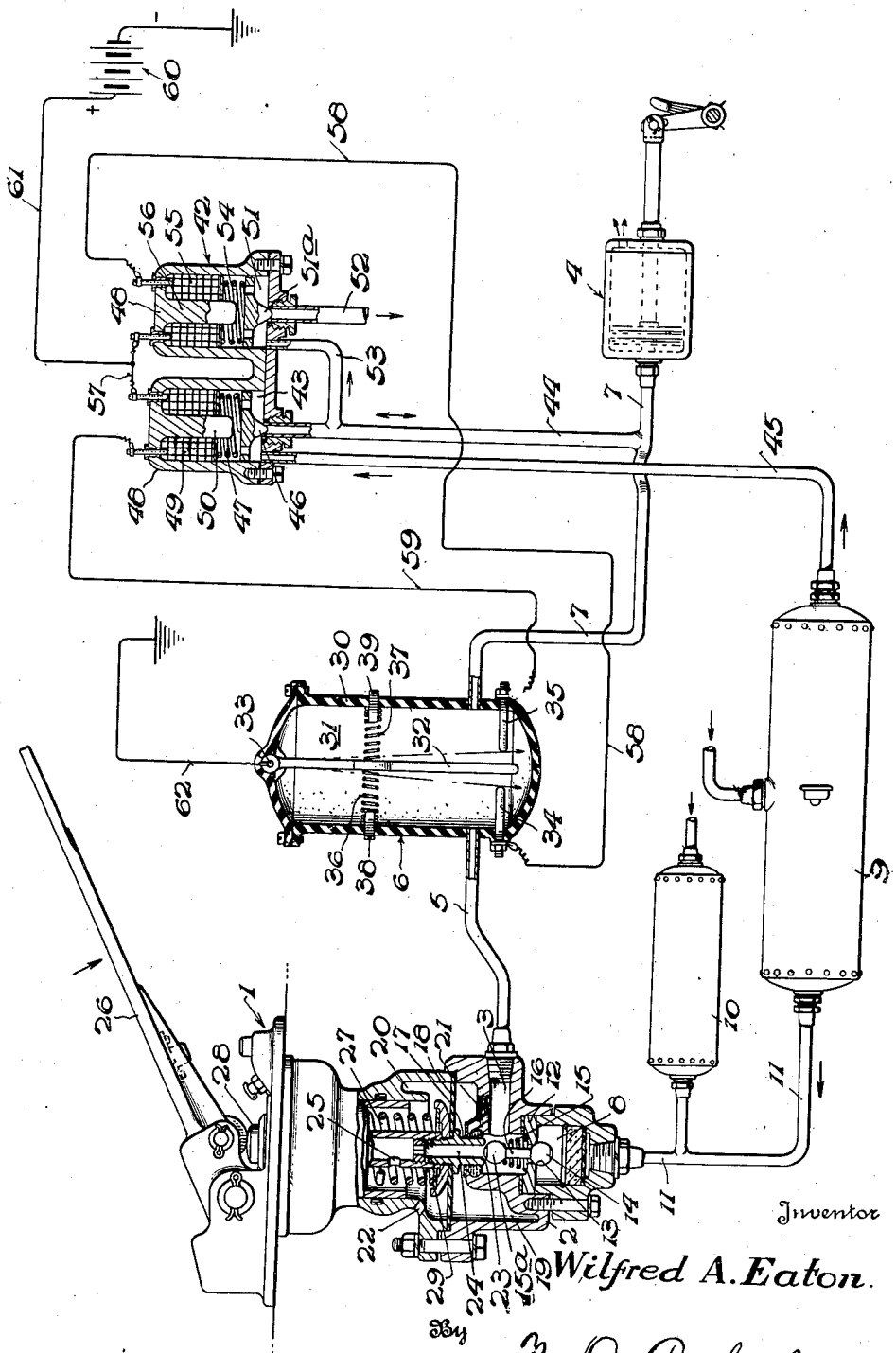
Inventor
Wilfred A. Eaton.
By
N. D. Parker Jr.
         Attorney Patented Oct. 17, 1944

2,360,659

UNITED STATES PATENT OFFICE 2,360,659

BRAKE MECHANISM

Wilfred A. Eaton, Elyria, Ohio, assignor to Bendix-Westinghouse Automotive Air Brake Company, Elyria, Ohio, a corporation of Delaware Application December 16, 1942, Serial No. 469,269

16 Claims. (Cl. 303—15)

This invention relates to control mechanism for fluid motors, and more particularly to a system for controlling fluid pressure in fluid motors adapted for the operation of vehicle brakes.

Systems of the above type have previously been proposed making use of electrically-operable valves, commonly known as magnet valves, in conjunction with the operator-controlled valves, hereinafter referred to as brake valves, in order to expedite the supplying and exhausting of fluid pressure to and from fluid motors of the type used for actuating vehicle brakes. Such systems have, however, in many cases, required the use of special and comparatively complicated brake valve structures for effecting the necessary co-ordinated control of the electrically-operable valves.

It is accordingly an object of the present invention to overcome these difficulties and to provide, in a system of the above described type, controlling means for the magnet valves which may be readily adapted for use in connection with brake systems of the type already in common use.

Another object is to provide, in connection with conventional fluid pressure braking systems, a novel mechanism for controlling energization of the magnetic valves so constituted as to interrupt energization of the magnetic valves, and consequent consumption of electrical energy, when the brake valve of the system is in either released or lapped position.

Another object is the provision, in a control system of the above character, of mechanisms so constructed as to permit operation and control of the brakes by the brake valve alone in the event of failure of the supply of electrical energy for operating the magnetic valves.

Still another object is to provide a novel switching device for controlling energization of the magnetic valve included in an electro-magnetic control system of the foregoing type in response to the velocity of the fluid pressure supplied from the brake valve when the latter is operated and in response to the velocity of the fluid pressure exhausted through the brake valve after the latter is moved to the released position thereof.

Other objects and novel features of the invention will appear more fully hereinafter from the following detailed description when considered in connection with the accompanying drawing, wherein one embodiment of the invention is illustrated. It is to be expressly understood, however, that the drawing is employed for purposes of illustration only and is not designed as a definition of the limits of the invention, reference for this purpose being had to the appended claims.

In the drawing, the single view is a diagrammatic representation, partially in section, with a fluid motor control system constructed in accordance with the principles of the present invention.

Referring to the drawing, the invention is illustrated as including a self-lapping brake valve 1, which may be of any conventional construction such as the general type disclosed in the patent to William J. Andres and Roy S. Sanford No. 2,133,275, dated October 18, 1938, having a casing 2 provided with an outlet chamber 3 connected to a fluid motor 4 by means of conduit 5, switch mechanism 6, the purpose of which will appear more fully hereinafter, and conduit 7. The casing 2 also includes an inlet chamber 8 connected to fluid pressure reservoirs 9 and 10 by means of a conduit 11. Any number of fluid pressure reservoirs may be employed, and such reservoirs may be supplied with fluid pressure from a single source or from a plurality of isolated sources. The inlet chamber 8 is separated from the outlet chamber by a partition 12 provided on its lower side with an intake valve seat 13, and communication between the two chambers is normally interrupted by means of an intake valve 14 held against seat 13 by a spring 15 interposed between the upper side of partition 12 and an exhaust valve 15a positioned in the outlet chamber and rigidly connected to the intake valve by a valve stem 16. A valve-operating element 17, normally spaced from exhaust valve 15a, is secured as shown to a flexible diaphragm member 18 carried by the casing and dividing the upper portion thereof into diaphragm and exhaust chambers 19 and 20 respectively, the former chamber being connected with the outlet chamber 3 by a choked passage 21 and the exhaust chamber being connected to atmosphere by means of an exhaust port 22. An exhaust valve seat 23 is formed at the lower end of valve-operating element 17, and a bore 24 formed in element 17 concentric with the seat normally serves to connect outlet chamber 3 with exhaust chamber 20 through a port 25 leading from the bore 24 to the exhaust chamber. The intake and exhaust valves are readily operated by means of a foot pedal 26 pivotally mounted on a portion of the casing 2 and connected with the valve-operating element 17 through a graduating spring 27 interposed between a plunger 28 actuated by the pedal and a spring seat 29 carried by the element 17.

It will be understood by those familiar with the type of brake valve above described that, when the brake pedal 26 is depressed a predetermined amount and held in such position, the air pressure in chamber 19 acting on the lower side of diaphragm 18 will eventually balance the spring force exerted by the graduating spring 27, at which point the diaphragm will move the valve-operating element 17 to a position at which both the intake and exhaust valves are in closed position, with the pressure in the outlet chamber of the brake valve and in the fluid motor substantially proportional to the degree of movement of the brake valve pedal. As more thoroughly explained in the above referred to patent, the choke 21 between the outlet chamber 3 and the diaphragm chamber 19 serves to delay the flow of fluid pressure from chamber 3 to chamber 19, the result being that, on a sudden application of the brake valve, the pressure in chamber 19 builds up at a much slower rate than the pressure in chamber 3, while, on release of the brake valve pedal, it will be obvious that the reverse action takes place.

As previously stated, one of the features of the present invention is to provide a device for controlling operation of electro-magnetic valves of such design and construction that the same may be readily employed in any type of fluid pressure braking system. The foregoing device is further characterized in that any type of brake valve employed in conventional fluid power braking systems may be employed therein and operated in the usual manner.

In order to accomplish the foregoing, it is contemplated by the present invention to provide novel means responsive to a predetermined velocity of the flow of fluid pressure supplied to the fluid motor for actuating the brakes upon operation of a conventional manually-operable brake valve, and which is responsive to a predetermined velocity of the flow of fluid pressure through the brake valve when the latter is moved to a normal position to exhaust fluid pressure from the system, to control energization of suitable electrically-operable valves which function to form fluid connection between a source of fluid pressure and the fluid motor and, alternately, a connection between the fluid motor and atmosphere.

As shown, the foregoing means comprises the switch mechanism 6 which is connected to the brake valve 1 and to the fluid motor 4 by means of the conduits 5 and 7. The switch mechanism 6 comprises a closed casing 30, constructed of any suitable insulating material, which forms a chamber 31. The conduit 5 is connected to the lower end of the casing 30 in communication with the chamber 31, while the conduit 7 is connected to the casing 30 in fluid communication with the chamber 31 at a point diametrically opposite the conduit 5. A vane-shaped switching member 32, constructed of any suitable electrically-conductive material, is mounted within the chamber 31 for movement about a pivot 33 positioned in the upper end of the casing 30. The switch member 32 extends downwardly in the chamber 31, as viewed in the drawing, and terminates a substantial distance beyond the points where the conduits 5 and 7 are connected to the casing 30. The switching member 32 has a substantial depth so that the fluid pressure supplied to the chamber 31, by way of the conduits 5 or 7, impinges upon the switching member 32 and applies a force thereto that is proportional to the velocity of the fluid pressure supplied. The switch mechanism 6 further includes a pair of electrical switch contacts 34 and 35 diametrically opposed and mounted in the lower portion of the casing 30 adjacent the conduits 5 and 7 respectively, springs 36 and 37 being provided for normally maintaining member 32 in the position shown. The tension of the springs 36 and 37 may be varied upon movement of adjusting members 38 and 39.

With the foregoing arrangement, the switch member 32 normally occupies the position shown wherein the terminating end thereof is substantially equally distant from the switch contacts 34 and 35. When a source of fluid pressure is supplied to the chamber 31, by way of the conduit 5, the fluid pressure impinges upon the switching member 32 and applies a force thereon that is proportional to the velocity of the fluid pressure supplied, which tends to rotate the switching member 32 in a counterclockwise direction about the pivot 33. As the velocity of the fluid pressure supplied through the conduit 5 increases to a predetermined value, a sufficient force is applied to the switching member 32 which rotates the latter in a counterclockwise direction, against the tension of the spring 37, into engagement with the switch contact 35. Conversely, when the velocity of the fluid pressure supplied to the chamber 31, by way of the conduit 7, is of a predetermined value to apply a sufficient force to the switching member 32 to rotate the latter in a clockwise direction about the pivot 33, against the tension of the spring 36, the terminating end of the switch member 32 is moved into engagement with the switch contact 34. It is to be expressly understood that the dimensions of the chamber 31 and the switching member 32 are such that fluid pressure may freely pass through the chamber 31 to the conduits 5 or 7. Moreover, the velocity of the fluid pressure required to move the switch member 32 into engagement with either switch contacts 34 or 35, in a manner noted above, is determined by the size of member 32 and the tension of the springs 36 and 37 which may be readily varied by the adjusting members 38 and 39.

In order that the supply of fluid pressure may be delivered to and released from the fluid motor 4 as rapidly as possible, there is provided and illustrated in the present invention a double magnet valve 42, having an outlet chamber 43 connected to the fluid motor conduit 7 by means of conduit 44, and to the supply reservoir 10 by means of conduit 45, communication between the outlet chamber 43 and conduit 44 being normally interrupted by means of valve 46 held against the outlet of chamber 43 by means of a spring 47. A casing 48 of suitable magnetic material encloses a magnet coil 49 and, in conjunction with a center pole piece 50, acts to move the valve to open position whenever the coil is energized. The magnet valve 42 is provided with an exhaust chamber 51, having a conduit 52 leading to atmosphere, together with a conduit 53 connected to the conduit 44 leading to the fluid motor. An exhaust valve 51a ordinarily closes the outlet to conduit 52 and is held in this position by means of an exhaust valve spring 54, and it will be readily seen that energization of magnet coil 55, carried by casing 48, will cause the pole piece 56 to move valve 51a upwardly so as to connect chamber 51 with the atmosphere, thus exhausting fluid pressure from the motor 4.

Since fluid motors for operating brake mechanism are ordinarily located at a point remote from the regular brake control valve, a long conduit is necessary to connect the brake valve with the motor. It will be noted that, by the present invention, the use of an ordinary brake valve together with an auxiliary electrically-operated valve provides for the control of fluid pressure to the motor, not only through the regular brake valve, but also through the magnet valve which may be located at a point adjacent to the fluid motor 4.

In order that the magnetic valve 42 may operate satisfactorily to carry out the functions described above, a terminal of each of the coils 49 and 55 is connected by a common conductor 57, while the other terminals of each of the coils are respectively connected by means of electrical conductors 58 and 59 to switch contacts 34 and 35 of the switch mechanism 6. A source of electrical energy from a battery 60 is connected between the conductor 57, by means of a connector 61, and the switching member 32 through the electrical conductor 62. With the foregoing connections, the electrical circuit between the magnetic coils 49 and 53 and the battery 60 is incomplete when the switching member 32 occupies a normal position substantially equally distant from the switch contacts 34 and 35, as shown. However, when fluid pressure is supplied to the chamber 31, by way of conduit 5, of sufficient velocity to move the switching member 32 into electrical engagement with the switch contact 35, an electrical circuit is completed between the battery 60 and the magnetic coil 49, whereupon the valve 46 is moved upwardly, as viewed in the drawing, to permit the flow of fluid pressure from the reservoir 9 to the fluid motor 4 by way of the conduit 45, the magnetic valve outlet chamber 43 and the conduits 44 and 7. In like manner, when the velocity of the fluid pressure supplied to the chamber 31, through the conduit 7, is of sufficient value to move the switching member 32 into electrical engagement with the switch contact 34, an electrical circuit is completed between the magnetic coil 55 and the battery 60. Upon energization of the magnetic coil 55, the exhaust valve 51a is moved upwardly, as viewed in the drawing, to connect the fluid motor 4 to atmosphere by way of the conduits 7, 44 and 53, the exhaust chamber 51 and the conduit 52. It is to be expressly understood that, whenever the velocity of the fluid pressure supplied to the chamber 31, by way of the conduits 5 or 7, drops below a value required to maintain the switching member 32 in electrical engagement with the switch contacts 34 or 35, the electrical circuits between the battery 60 and the magnetic coils 49 or 55 are terminated. When the magnetic coils 49 and 55 are deenergized in the foregoing manner, the valves 46 and 51a are moved downwardly to the normal positions thereof by the tensions of the springs 47 and 54 respectively to thus interrupt the connection between the reservoir 9 and the fluid motor 4 and between the fluid motor and the atmosphere by way of conduit 52.

From the foregoing description, it will be understood that, upon downward movement of the brake pedal 26 to effect a brake application, the intake valve 14 is moved downwardly to allow fluid pressure from the reservoirs 9 and 10 to flow into the outlet chamber 3 and to the chamber 31 of the switch mechanism 6 by way of the conduit 5. If the velocity of the fluid pressure supplied by way of the conduit 5 is above a predetermined value, determined by the tension of the spring 37, the switching member 32 is moved into engagement with the switch contact 35, thus completing an electrical circuit between the magnetic coil 49 and the battery 60. The valve 46 is, therefore, moved upwardly to allow fluid pressure from the reservoir 9 to energize the motor 4. When the brake valve 1 moves to a lapped position, the velocity of the fluid pressure supplied to the chamber 31 by way of the conduit 5 diminishes to a value below the predetermined velocity value required to maintain the switching member 32 in engagement with the switch contact 35 and the switching member 32 is therefore moved to the normal position thereof by the tension of the spring 37. The electrical circuit between the magnetic coil 49 and the battery 60 is, therefore, terminated at substantially the same instant the brake valve 1 becomes lapped, thus deenergizing the magnetic coil 49 and interrupting the fluid connection between the reservoir 9 and the fluid motor 4 by way of the valve 42. In the event that further application of the brakes is desired, an additional force is applied to the brake pedal 26 and fluid pressure from the reservoirs 9 and 10 is supplied to the chamber 31 to again move the switching member 32 into engagement with the switch contact 35 to thus energize the magnetic coil 49 and supply additional fluid pressure to the fluid motor 4 until the brake valve 1 again moves to lapped position.

When a release of the brakes is desired, the pressure applied to the brake pedal 26 is removed, thus allowing the brake valve 1 to return to the normal position thereof wherein the outlet chamber 3, and consequently the conduit 5, are connected to atmosphere through the bore 24 and the ports 25 and 22. At the instant the conduit 5 is exhausted to atmosphere, the fluid pressure in the conduit 7 flows into the chamber 31 at sufficient velocity to move the switching member 32 into engagement with the switch contact 34 to thus connect the magnetic coil 55 in a circuit with the battery 60. Upon energization of the magnetic coil 55, the exhaust valve 51a is moved upwardly to exhaust the fluid motor 4 to atmosphere through the conduits 7, 44, 53 and 52.

There is thus provided by the present invention a novel switching device for controlling operation of electromagnetic valves. The switching device is so characterized that the same may be readily installed in any type of conventional fluid pressure braking systems for controlling electro-magnetic operation of the brakes upon the usual operation of the conventional brake valve employed in such systems. Furthermore, the novel means disclosed herein operates in such a manner, in response to movements of the manually-operable brake valve, to control operation of suitable electro-magnetic valves at substantially the same instant the manually-operable brake valve functions, to supply a source of fluid pressure to the brake-actuating motor that corresponds to the degree of fluid pressure emitted from the brake valve, while the device rapidly functions, when the brake valve is moved to a released position, to exhaust the fluid motor to atmosphere at substantially the same instant. Moreover, it is to be pointed out that the electrical system disclosed herein only functions when the brake valve is operated to effect an application of the brakes, to vary a degree of brake application, or when the brake valve is operated to release the brakes. With such an arrangement, no current is consumed from the battery 60 whenever the brake valve is in a released position or in a lapped position. Also, since fluid pressure may readily flow from the conduit 5 to the conduit 7 by way of the chamber 31, the fluid motor may be energized with fluid pressure directly from the brake valve 1 in the event that the current supply for energizing the valve 42 is not available or in the event that the electrical circuit is rendered inoperative for other abnormal reasons.

Although only one embodiment of the invention has been described and illustrated herein, it is to be expressly understood that various changes and substitutions may be made therein without departing from the spirit of the invention as well understood by those skilled in the art. Reference will, therefore, be had to the appended claims for a definition of the limits of the invention.

What is claimed is:

1. In combination with a source of fluid pressure and a fluid motor, electrically-operated valve means for controlling the flow of fluid pressure between said source and said motor, other means for controlling the flow of fluid pressure between said source and motor, means responsive to the impact of fluid pressure flowing through said other means for controlling said valve means and manually-operable means for controlling the flow of fluid pressure through said other means.

2. In combination with a source of fluid pressure and a fluid motor, electrically-operated valve means for controlling the flow of fluid pressure between said source and said motor, switching means, and manually-operable valvular means for controlling the flow of fluid pressure from said source through said switching means to said motor, said switching means including means responsive to the impact of the fluid pressure fed therethrough for controlling operation of said valve means.

3. In combination with a source of fluid pressure and a fluid motor, electrically-operated valve means normally blocking the flow of fluid pressure from said source to said motor, switching means for controlling operation of said valve means, and manually-operable valvular means for controlling the flow of fluid pressure from said source through said switching means to said motor, said switching means including means responsive to a predetermined impact of the fluid pressure supplied thereto for energizing said valve means to allow the flow of fluid pressure from said source to said motor.

4. In combination with a source of fluid pressure and a fluid motor, electrically-operated valve means normally blocking the flow of fluid pressure from said source to said motor, switching means for controlling operation of said valve means, and manually-operable valvular means for controlling the flow of fluid pressure from said source through said switching means to said motor, said switching means including means responsive to the impact of the fluid pressure flowing therethrough for energizing said valve means to allow the flow of fluid pressure from said source to said motor when the velocity of the fluid pressure is above a predetermined value and for deenergizing said valve means when the velocity of the fluid pressure is below said predetermined value.

5. In combination with a source of fluid pressure and a fluid motor, a connection therebetween including manually-operable valvular means for controlling the flow of fluid pressure between said source and said motor, electrically-operated valve means for controlling the flow of fluid pressure between said source and said motor, and means responsive to the impact of the fluid pressure flowing in said connection between said valvular means and said motor for controlling said valve means.

6. In combination with a source of fluid pressure and a fluid motor, a connection therebetween including manually-operable valvular means for controlling the flow of fluid pressure between said source and said motor, electrically-operated valve means normally blocking the flow of fluid pressure from said source to said motor, and means responsive to the impact of the fluid pressure flowing in said connection between said valvular means and said motor for controlling said valve means, the last-named means being so constructed and arranged to energize said valve means to allow the flow of fluid pressure between said source and said motor when the velocity of said fluid pressure is above a predetermined value and for deenergizing said valve means when the velocity of said fluid pressure is below said predetermined value.

7. In combination with a source of fluid pressure and a fluid motor, a connection therebetween including manually-operable valvular means for controlling the flow of fluid pressure from said source to said motor and for discharging fluid pressure in said motor to atmosphere, electrically-operated valve means for controlling the flow of fluid pressure from said source to said motor and for discharging fluid pressure in said motor to atmosphere, means responsive to the impact of the fluid pressure flowing in said connection from said valvular means to said motor for energizing said valve means for allowing the flow of fluid pressure to said motor, and the last-named means responsive to the impact of the flow of fluid pressure through said connection in the reverse direction for deenergizing said valve means to discharge the fluid pressure in said motor to atmosphere.

8. In combination with a source of fluid pressure and a fluid motor, a connection therebetween including manually-operable valvular means for controlling the flow of fluid pressure from said source to said motor and for discharging the fluid pressure in said motor to atmosphere, first electrically-operated valve means for controlling the flow of fluid pressure from said source to said motor, second electrically-operated valve means for exhausting the fluid pressure in said motor to atmosphere, and means responsive to the impact of the flow of fluid pressure between said valvular means and said motor through said connection for controlling said first and said second valve means.

9. In combination with a source of fluid pressure and a fluid motor, a connection therebetween including manually-operable valvular means for controlling the flow of fluid pressure from said source to said motor and for discharging the fluid pressure in said motor to atmosphere, first electrically-operated valve means for controlling the flow of fluid pressure from said source to said motor, second electrically-operated valve means for exhausting the fluid pressure in said motor to atmosphere, and means responsive to the impact of the flow of fluid pressure in said connection between said valvular means and said motor for controlling operation of said first and said second valve means, the last-named means being responsive when the velocity of the flow of fluid pressure from said valvular means to said motor exceeds a predetermined value for energizing said first valve device and responsive when the velocity of the flow of fluid pressure from said motor to said valvular means exceeds a predetermined value for energizing said second valve means.

10. In combination with a source of fluid pressure and a fluid motor, a connection therebetween including manually-operable valvular means for controlling the flow of fluid pressure from said source to said motor and for discharging the fluid pressure in said motor to atmosphere, first electrically-operated valve means for controlling the flow of fluid pressure from said source to said motor, second electrically-operated valve means for exhausting fluid pressure in said motor to atmosphere, means responsive to the impact of the flow of fluid pressure in said connection from said valvular means to said motor for controlling operation of said first valve means and means responsive to the impact of the flow of fluid pressure from said motor to said valvular means in said connection for controlling operation of said second valve means.

11. In combination with a source of fluid pressure and a fluid motor, manually-operable valvular means connected to said source, a connection between said valvular means and said motor, electrically-operated valve means for controlling the flow of fluid pressure from said source to said motor, and means positioned in said connection for controlling operation of said valve means, the last-named means responsive to the impact of the flow of fluid pressure through said connection when the velocity thereof exceeds a predetermined value for energizing said valve means.

12. In combination with a source of fluid pressure and a fluid motor, a plurality of connections between said source and said motor, manually-operated valvular means included in one of said connections for controlling the flow of fluid pressure therethrough, electrically-operated valve means included in another of said connections for controlling the flow of fluid pressure therethrough, and means responsive to the impact of the flow of fluid pressure through said one connection for controlling operation of said valve means.

13. In combination with a source of fluid pressure and a fluid motor, a connection between said source and said motor, manually-operated valvular means included in said connection for controlling the flow of fluid pressure from said source to said motor and for exhausting fluid pressure in said motor to atmosphere, electrically-operated valve means for controlling the flow of fluid pressure from said source to said motor and for exhausting fluid pressure in said motor to atmosphere, means included in the connection between said valvular means and said motor responsive to the impact of the flow of fluid pressure from said valvular means to said motor for energizing said valve means to allow the flow of fluid pressure from said source to said motor, and the last-named means responsive to the impact of the flow of fluid pressure from said motor to said valvular means for energizing said valve means to exhaust fluid pressure in said motor to atmosphere.

14. In combination with a source of fluid pressure and a fluid motor, a plurality of connections between said source and said motor, manually-operable means included in one of said connections for controlling the flow of fluid pressure from said source to said motor and for exhausting fluid pressure in said motor to atmosphere, first electrically-operated valve means included in another of said connections for controlling the flow of fluid pressure therethrough, second electrically-operated valve means for controlling a connection between said motor and atmosphere, and means included in said one connection responsive to the impact of the flow of fluid pressure therein from said valvular means to said motor for operating said first valve means and responsive to the impact of the flow of fluid pressure from said motor to said valvular means in said one connection for controlling operation of said second valve means.

15. In combination with a source of fluid pressure and a fluid motor, a connection between the source and motor, valve means for controlling the flow of fluid pressure from said source to said motor through said connection, means including a power operated valve for supplying fluid pressure separately from said source to said motor, and means for controlling the energization of said power operated valve including an element responsive to the impact of the fluid flowing in said connection.

16. The combination with a fluid pressure supply system for a fluid motor including a source of fluid pressure, a connection between the source and the fluid motor, and valve means associated with said connection for controlling the flow of fluid pressure therethrough, of auxiliary means for supplying fluid pressure to the motor including electrically operable valvular means connected with said source and motor, and means including an element subjected to the impact of fluid flowing in said connection for controlling the energization of said valvular means.

WILFRED A. EATON.